Figures 1, 2:
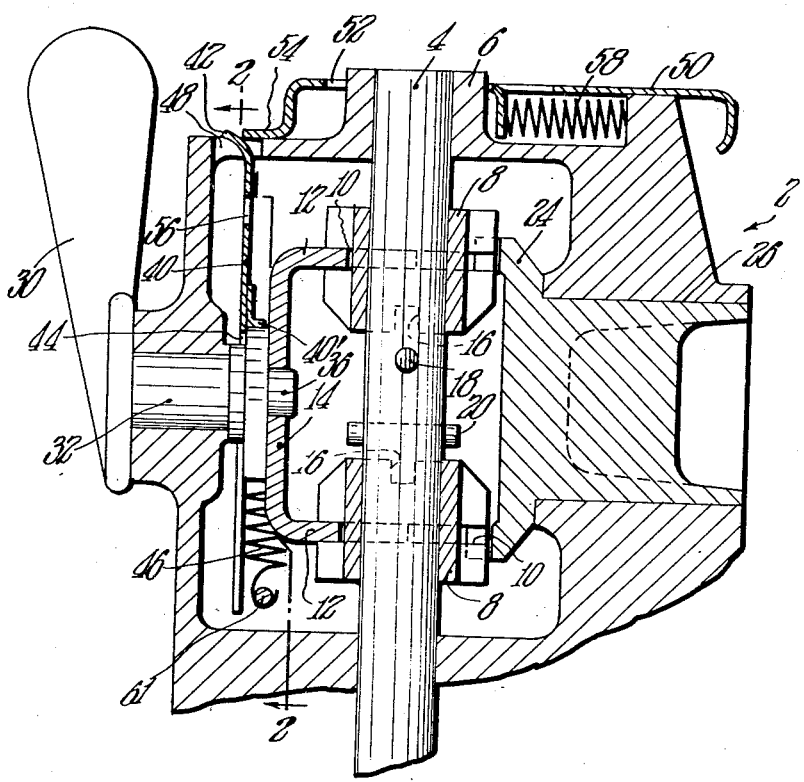

Oct. 10, 1939.   J. L. PERKINS   2,175,732
DRIVING MECHANISM
Filed Jan. 5, 1939

INVENTOR.
Julian L. Perkins.
BY Walter C. Rau.
ATTORNEY.

Patented Oct. 10, 1939

2,175,732

UNITED STATES PATENT OFFICE 2,175,732

DRIVING MECHANISM

Julian L. Perkins, West Springfield, Mass.

Application January 5, 1939, Serial No. 249,436

9 Claims. (Cl. 74—355)

This invention relates to improvements in driving mechanism and this application is a continuation in part of an application Ser. No. 201,345 filed by me on April 11, 1938.

The principal objects of the invention are directed to the provision of a driving mechanism which, while adapted for general uses, is particularly adapted for the wringers of washing machines or for wringer heads used with the wringers of washing machines and the mechanism is characterized by a novel combination of parts arranged and adapted to provide a compact assembly which is economical to produce and efficient in operation.

According to special features of the invention the driving mechanism is characterized by a pair of driving gear members which are in permanent mesh with a driven member and the said driving members are shiftable between inoperative and operative positions by a shifter so that the driven member, which can be employed for driving a wringer, may be rotated in opposite directions. The construction of the invention functions as a reversing driving mechanism which, by reason of the novel combination and arrangement of parts, operates positively and noiselessly.

Various other novel features and advantages of the invention will be hereinafter more fully referred to in connection with the following description of the invention, reference being had to the accompanying drawing, wherein:

Fig. 1 is a side elevational view showing the driving mechanism of the invention, with parts in section; and Fig. 2 is a sectional view on the line 2—2 of Fig. 1.

Referring now to the drawing in detail, the invention will be more fully described.

In the drawing a casing is represented at 2. This may take any desired form but for purposes of disclosure it is shown adapted for mounting on the top of the column of a washing machine and to have secured at a side thereof a wringer.

A drive shaft 4 is rotatable in the casing 2, there being an upper journal bearing 6 of suitable form provided therefor. Separate pinion gears 8 are slidable on the shaft 4 and these have circumferential grooves such as 10 therearound.

These grooves 10 are intended to receive the end most portions 12 of a shifter member 14. As the shifter 14 is moved up or down, it moves the pinions 8 up or down simultaneously.

The inner or adjacent ends of gears 8 are provided with one or more notches or sockets 16, as shown, for receiving engageable means such as the end portions of either a pin 18 or a pin 20 which are fixed to the shaft 4, depending upon whether the gears move up or down. A driven gear 24 is rotatable in a bearing 26 of the casing and it is of the face type having teeth extending axially thereof as shown and to this gear may be connected a shaft or wringer roll of a wringer or the like.

The teeth of gear 24 are in mesh with the pinions 8. The said pinions are sufficiently long of face so that they may be shifted on the shaft 4 in one direction or the other with the teeth of the face gear at all times in mesh with the pinions whereby said pinions and face gear are always in operative engagement.

An operating lever 30 has a shaft 32 journalled in the casing 2 and this shaft carries a member 34 shown more clearly in Fig. 2. The latter is preferably rounded on its upper side but has straight side edges as shown.

Carried by member 34 is an off-center pin 36 and this is received in a suitable elongated slot provided in member 14. Thus when lever 30 is oscillated in one direction or the other, the engagement of pin 36 with member 14 moves the same up or down.

Preferably the operating member is normally held by some suitable means, in the neutral inoperative position shown in Fig. 1, and said means or other means may be provided to releasably hold the parts in operative position or relation and may consist of a spring pressed detent or detents or the like.

A plate member 40 is slidable up and down in the head and it has a curved flange part 42 on its upper end. The plate 40 is slotted at 44 so as to receive the shaft 32. A spring means such as springs 46 is preferably provided to urge the plate 40 downwardly and yieldingly resist upward movements thereof. The springs 46 are connected at upper and lower ends to the plate 40 and a transverse rod 47, as shown.

When the operating member 30 is oscillated from its neutral position, in either direction, the member 34 engages a curved flange 40' provided on plate 40 so as to elevate said plate 40 and so that its upper end portion 42 passes upwardly through a slot 48 provided in the casing 2. A latch member 50 is slidable horizontally relative to the casing and it has a slot 52 for receiving bearing 6. The latch member 50 is moved to the right, from the position shown, by the upper end 42 of plate 40 as it is elevated.

There is a downwardly extending lip part 54 on latch 50 and this is adapted to enter a slot 56 in plate 50 when the latter is in its upper position. A spring such as 58 urges the latch towards the plate, or to the left as shown.

When latch 50 is in its left-most position, part 42 of plate 40 engages part 54 as the plate moves upwardly and moves the latch to the right against spring 58. Then as plate 50 continues upwardly, its slot 56 coincides with lip 54 and allows latch 50 to return to the left so that part 54 enters slot 56.

When latch 50 moves to the right again plate 40 is released so that it moves downwardly again, being pulled downwardly by springs 46 provided for that purpose. Also, it will be seen, downward movement of plate 40 causes the same to act upon the side edges of member 34, thereby rotating the same and bringing shifter 14 to neutral position.

The method of operation will now be described.

The operating lever 30 is oscillated to move the shifter 14 up or down and, consequently, the pinions 8 up or down. When the lever is thus swung, plate 40 is also elevated so that its upper end is releasably engaged and held in upper position by the latch 50 as described.

The parts are shown in a neutral position and assuming that the shaft 4 is connected to a shaft in a column of a washing machine, the said shaft 4 may be rotated without imparting motion to the face gear 24. When the operating member 30 is swung to move the shifter 14 up or down so that upper gear 8 engages pin 18 or lower gear 8 engages pin 20 so that either of the gears 8 is locked to the shaft, the engagement of one of the gears 8 with the face gear causes the latter to be rotated for driving the wringer rolls. The shifter is moved upwardly for driving the face gear in one direction and is moved downwardly for driving it in an opposite direction.

It will be observed from the foregoing that the mechanism is simple in form and characterized by the shifter and pinions being in mesh. According to the novel construction the operation of the mechanism is noiseless and the movement of the shifter and gears is readily accomplished.

While I have described the invention in great detail and with respect to a preferred form thereof, it is not desired to be limited thereto since many changes and modifications may be made therein without departing from the spirit and scope of the invention.

What it is desired to claim and secure by Letters Patent of the United States is:

1. A driving mechanism of the class described comprising in combination, a support, driving and driven shafts, a driven gear on the driven shaft, a pair of driving gears on said drive shaft in permanent sliding mesh with the driven gear and reciprocable on said shaft between a neutral position and operative positions at either side of said neutral position, engageable means associated with said driving gears and drive shaft arranged whereby the said driving gears are operatively connected to said shaft accordingly as they are in operative position and disconnected when in neutral position, and shiftable means for reciprocating said driving gears.

2. A driving mechanism of the class described comprising in combination, a support, driving and driven shafts, a driven gear on the driven shaft, a pair of driving gears on said drive shaft in permanent sliding mesh with the driven gear and reciprocable on said shaft between a neutral position and operative positions at either side of said neutral position, engageable means associated with said driving gears and drive shaft arranged whereby the said driving gears are operatively connected to said shaft accordingly as they are in operative position and disconnected when in neutral position, and shiftable means for moving said driving gears, said engageable means including recess provided on said driving gears and a key on said drive shaft receivable therein.

3. A driving mechanism of the class described comprising in combination, a support, driving and driven shafts, a driven gear on the driven shaft, a pair of driving gears on said drive shaft in permanent sliding mesh with the driven gear and reciprocable on said shaft between a neutral position and operative positions at either side of said neutral position, engageable means associated with said driving gears and drive shaft arranged whereby the said driving gears are operatively connected to said shaft accordingly as they are in operative position and disconnected when in neutral position, and shiftable means for moving said driving gears, said shiftable means including a shifter engaging said drive gears and a rotatable member connected thereto.

4. A driving mechanism of the class described comprising in combination, a support, driving and driven shafts, a driven gear on the driven shaft, a pair of driving gears on said drive shaft in permanent mesh with the driven gear and reciprocable on said shaft between a neutral position and operative positions at either side of said neutral position, engageable means associated with said driving gears and drive shaft arranged whereby the said driving gears are operatively connected to said shaft accordingly as they are in operative positions and disconnected when in neutral position, shiftable means for moving said driving gears, said shiftable means including a reciprocating member connected to said gears holding them in spaced relation, a rotatable member, and connections between said rotatable member and reciprocating member arranged whereby the latter is actuated by the former.

5. A driving mechanism of the class described comprising in combination, a support, driving and driven shafts, a driven gear on the driven shaft, a pair of driving gears on said drive shaft in permanent mesh with the driven gear and reciprocable on said shaft between a neutral position and operative positions at either side of said neutral position, engageable means associated with said driving gears and drive shaft arranged whereby the said driving gears are operatively connected to said shaft accordingly as they are in operative position and disconnected when in neutral position, and shiftable means for moving said driving gears including a movable member having parts in permanent engagement with said driving gears whereby the latter are held in spaced relation and may be moved into and out of neutral position by movement of said member.

6. A driving mechanism of the class described comprising in combination, a support, a driving and a driven shaft, a driven gear on the driven shaft, a pair of spaced driving gears on said drive shaft in permanent mesh with the driven gear and reciprocable simultaneously on said shaft between a neutral position and operative positions at either side of said neutral position, engageable means associated with said driving gears and drive shaft arranged whereby the said driving gears are operatively connected to said shaft accordingly as they are in operative position and disconnected when in neutral position, and a shifter for maintaining said driving gears in spaced relation and for moving said driving gears, said engageable means including a recess provided in the inner side of each of said driving gears and a pair of spaced pins on said drive shaft receivable in the recesses, the said shifter including a member having end portions receivable in grooves provided in said driving gears.

7. A driving mechanism of the class described comprising in combination, a support, driving and driven shafts, a driven gear on the driven shaft, a pair of driving gears in permanent sliding mesh with said driven gear reciprocable between a neutral position and operative positions at either side of said neutral position, engaging means associated with said driving gears and said drive shaft engageable for connecting either one of said gears to said shaft when in operative positions, shifting means for said driving gears including a member engaging said gears, and a member rotatable between operative and neutral positions, and yielding means acting on said rotatable member to return it to neutral position.

8. A driving mechanism of the class described comprising in combination, a support, driving and driven shafts, a driven gear on the driven shaft, a pair of driving gears in permanent sliding mesh with said driven gear reciprocable between a neutral position and operative positions at either side of said neutral position, engaging means associated with said driving gears and said drive shaft engageable for connecting either one of said gears to said shaft when in operative positions, shifting means for said driving gears including a member engaging said gears, and a member rotatable between operative and neutral positions, and yielding means acting on said rotatable member to return it to neutral position.

9. A driving mechanism of the class described comprising in combination, a support, driving and driven shafts, a driven gear on the driven shaft, a pair of driving gears in permanent sliding mesh with said driven gear reciprocable between a neutral position and operative positions at either side of said neutral position, engaging means associated with said driving gears and said drive shaft engageable for connecting either one of said gears to said shaft when in operative positions, shifting means for said driving gears including a shifter member operatively engaging said driving gears, a member rotatable between neutral and operative positions, connections between said members and spring means acting on said rotatable member urging the same from operative to neutral positions.

JULIAN L. PERKINS.